United States Patent
Wang et al.

(10) Patent No.: US 7,519,069 B2
(45) Date of Patent: Apr. 14, 2009

(54) INTERNET PROTOCOL ADDRESS UPDATING SYSTEM AND RELATED METHOD

(75) Inventors: Tsung-Pin Wang, Taipei (TW); Hsiao-Fen Lu, Taipei (TW); Lien-Hsun Chen, Taipei (TW)

(73) Assignee: Inventec Corporation (TW)

( * ) Notice: Subject to any disclaimer, the term of this patent is extended or adjusted under 35 U.S.C. 154(b) by 708 days.

(21) Appl. No.: 11/264,765

(22) Filed: Oct. 31, 2005

(65) Prior Publication Data
US 2007/0097869 A1 May 3, 2007

(51) Int. Cl.
*H04L 12/28* (2006.01)
(52) U.S. Cl. .................................. 370/395.52
(58) Field of Classification Search ................ None
See application file for complete search history.

(56) References Cited

U.S. PATENT DOCUMENTS 7,062,595 B2 * 6/2006 Lindsay et al. .............. 710/315
7,340,538 B2 * 3/2008 Alappat et al. ................ 710/5
7,395,323 B2 * 7/2008 Larson et al. ............... 709/222

OTHER PUBLICATIONS

Intel Hewlett-Packard NEC Dell, IPMI-Intelligent Platform Management Interface Specification Second Generation, V2.0, 590 pages, Feb. 2004.*

* cited by examiner

*Primary Examiner*—Frank Duong
(74) *Attorney, Agent, or Firm*—Peter F. Corless; Steven M. Jensen; Edwards Angell Palmer & Dodge LLP

(57) ABSTRACT

An IP address updating system and related method is applied to a network server having a management controller for the management controller to update IP installation information. The system includes an acquiring module, a comparing module and an updating module. The method first detects MACs of NICs attached to the network server and LAN channels of the management controller, and then compares the MACs of the NICs with the MACs of the LAN channels. When a MAC of one of the NICs is matched with a MAC of one of the LAN channels, installation fields of the matched LAN channel are updated with IP installation information of the matched NIC. Therefore, a system manager needs not to update the IP address time after time any more, and the network server has better efficiency of management.

10 Claims, 2 Drawing Sheets

INTERNET PROTOCOL ADDRESS UPDATING SYSTEM AND RELATED METHOD

BACKGROUND OF THE INVENTION

1. Field of the Invention

The present invention relates generally to an Internet protocol (IP) address updating technique and, more particularly, to an IP address updating system and related method capable of automatically updating IP address installation information of a management controller.

2. Description of the Background Art

In 1998, Intel, Dell, HP and NEC proposed an intelligent platform manage interface (IPMI) standard. The IPMI provides a platform standard interface, through which a system manager is able to monitor operating behaviors of a plurality of components in a system, such as the operation of a central processing unit, the rpm of an electrical fan, the temperature of the system, and the voltage of a hardware component. The system manager can further set corresponding sensing thresholds for the monitored components according to practical demands. Therefore, when sensing an abnormal event, an IPMI controller, that is a baseboard management controller (BMC), can record the abnormal event and current states of the system in the form of a diary, and send an E-mail or issue a simple network management protocol (SNMP) trap alarm to inform corresponding personnel of the whole story. With the help provided by certain hardware and software, the IPMI can further provide a function of remote management and system recall. Therefore, even the system manager is staying in an environment far from where the system is located, the system manager can still know the current states of the system. For example, the system manager knows a power-off state, a power-on state or a state when an operating system of the system stops working In accordance with monitoring results, the system manager issues a power-en command, a power-off command, or a reboot command to control the system remotely.

However, the system manager cannot control the remote system through the BMC successfully if IP addresses of the BMC are not matched with IP addresses of network interface cards (NIC) attached to the system. According to the prior an, the system manager sets the, IP addresses of the BMC manually through an IPMI driver with system management software (SMS). When the IP addresses (which are distributed randomly according to a dynamic host configuration protocol (DHCP)) of the NICs are changed, the system manager has to reset the IP addresses of the BMC manually with the SMS, so as to keep the IP addresses of the BMC to be matched with the IP addresses of the NICs. If the IP addresses of the BMC are not updated synchronically according to the IP addresses of the NICs, that is the IP addresses of the BMC being different from the IP addresses of the NICs, the system cannot function normally due to IP address conflict.

Therefore, it becomes an important issue to providing a mechanism capable of updating IP address installation information of the BMC automatically, not manually, when the IP addresses of the NICs attached to the system are changed, so as to promote the efficiency of the system such as a network server.

SUMMARY OF THE INVENTION

Accordingly, it is an objective of the present invention to solve the aforementioned problems of the prior art by providing an IP address updating system and related method, which is capable of updating IP installation information of the BMC as soon as IP address of an NIC is changed.

Another objective of the present invention is to provide an IP address updating system and related method capable of updating IP installation information of the BMC automatically; so a system manager needs not set IP-related information, and a network server having the IP address updating system has better performance and efficiency.

In order to attain the object mentioned above and the others, an IP address updating system and related method according to the present invention are proposed. The IP address updating system is applied to a network server having a management controller. The system includes an acquiring module for detecting media access addresses (MAC) of network interface cards (NIC) attached to the network server and channels of the management controller, a comparing module for comparing the MACs of the NICs with the MACs of the channels, and an updating module for updating installation fields of the channels of the management controller with corresponding IP installation information of the NICs if the comparing module compares that the MACs of the NICs are matched with the MACs of the channels. The IP installation information includes an IP address, a subnet mask and an IP gateway. The management controller is a baseboard management controller (BMC) capable of supporting intelligent platform management interface (IPMI). The channels of the management controller are local area network (LAN) channels. IP installation information of the LAN channels are read and installed by a system management software (SMS) through an IPMI driver. The acquiring module acquires the IP installation information of the network interface cards with an operating system of the network server.

The IP address updating method includes (1) detecting MACs of NICs attached to the network server and channels of the management controller, (2) comparing the MACs of the NICs with the MACs of the channels to determine if the MACs of the NICs are matched with the MACs of the channels, if the MACs of the NICs are determined to be matched with the MACs of the LAN channels executing step (3), or executing step (2) repeatedly, and (3) acquiring IP installation information of the NICs, and updating installation fields of the channels with corresponding IP installation information of the NICs. The IP installation information includes an IP address, a subnet mask and an IP gateway. The management controller is a baseboard management controller (BMC) capable of supporting intelligent platform management interface (IPMI). The channels of the management controller are local area network (LAN) channels. IP installation information of the LAN channels are read and installed by a system management software (SMS) through an IPMI driver. The method further includes acquiring the IP installation information of the network interface cards with an operating system of the network server.

In contrast to the prior art, the IP address updating system and related method updates the IP installation information of the management controller automatically as soon as the IP address information of the NICs are changed. A system manager needs not to update the IP information time after time any more, so the network server has better efficiency of management.

DESCRIPTION OF THE PREFERRED EMBODIMENTS

The following description contains specific information pertaining to the implementation of the present invention. One skilled in the art will readily recognize other advantages and features of the present invention after reviewing what specifically disclosed in the present application. It is manifest that, the present invention can be implemented and applied in a manner different from that specifically discussed in the present application. It should also be understood that the invention is not limited to the particular exemplary embodiments described herein, but is capable of many rearrangements, modifications, and substitutions without departing from the spirit of the present invention. Wherein, attention that the drawings according to the present invention are all simplified schematic diagrams should be paid to, i.e., they merely illustrate the components pertaining to the invention, and it is not limited to the components what illustrated, the number of the components, shape or proportion of size when actually implementing is a selective design, the layout of the component may be more complex.

The following embodiments further describe the technique means of the present invention in detail, but it is not used to limit the scope of the present invention.

Figure 1:
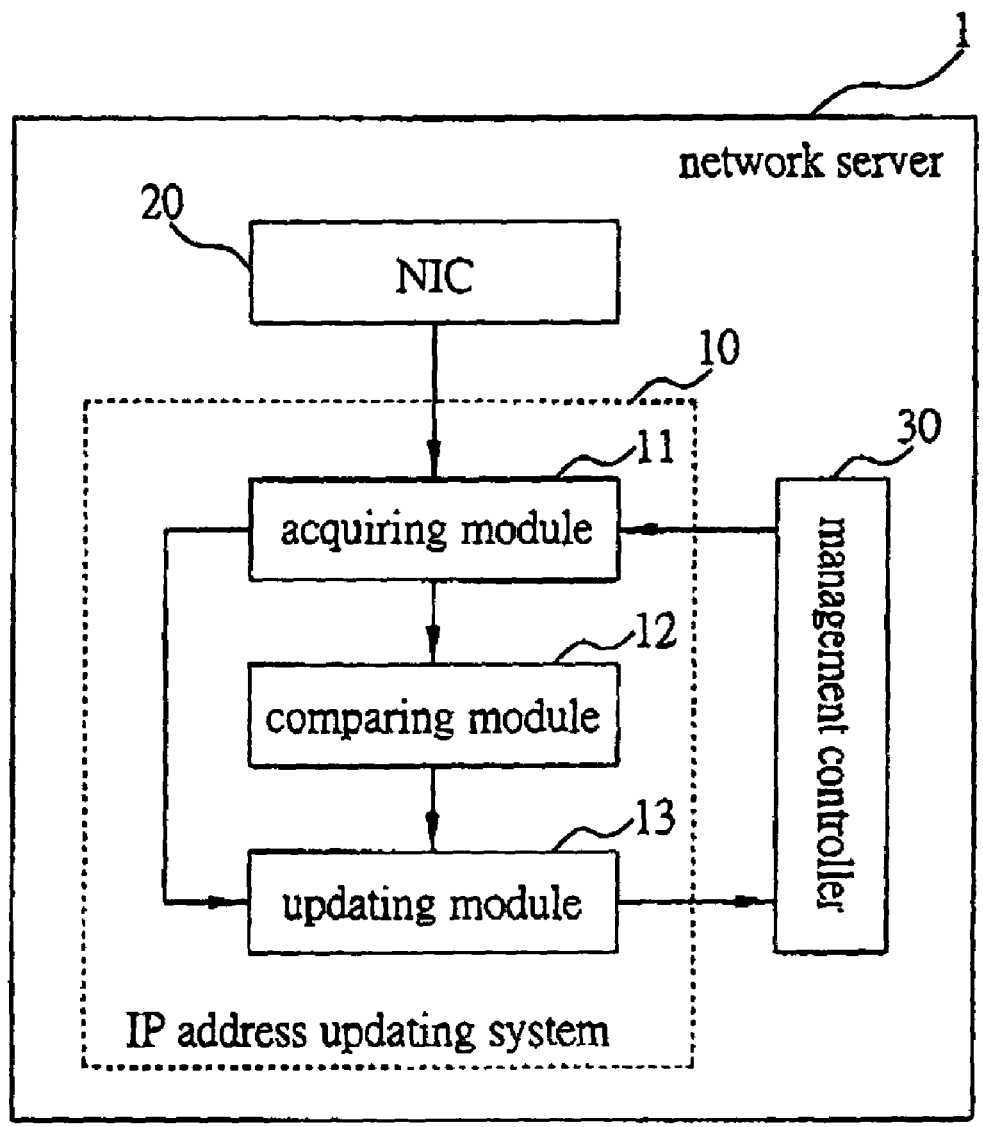
FIG. 1 is a functional block diagram of a network server having an IP address updating system according to the present invention.

Please refer to Fig. 1, which is a functional block diagram of a network server 1 having an IP address updating system 10 of the preferred embodiment according to the present invention. The network server 1 further comprises a management controller 30 and a network interface card (NIC) 20 attached to the network server 1. The IP address updating system 10 updates IP installation information of the management controller 30 synchronically when IP installation information of the NIC 20 are changed. According to the preferred embodiment, the management controller 30 is a. BMC capable of supporting a data transmission standard of an intelligent platform management interface (IPMI). In practice, the IP address updating system 10 of the present invention can be integrated into the form of a computer application program and installed into an operating system of the network server 1.

The IP address updating system 10 of the present invention comprises an acquiring module 11, a comparing module 12 and an updating module 13.

The acquiring module 11 detects media access address (MAC) of the NIC 20 and other, IP installation information, such as an IP address, a subnet mask and an IP gateway. The acquiring module 11 further acquires MACs of local area network (LAN) channels of the management controller 30. According to the preferred embodiment, the MACs of the LAN channels of the management controller 30 are read by the SMS through an IPMI driver, and the MAC and any other related is information of the NIC 20 are obtained by IP detecting tools through the operating system. How the IP information is obtained belongs to the prior art, further description hereby omitted.

The comparing module 12 compares the MAC of the NIC 20 with the MACs of the LAN channels of the management controller 30 one by one, and determines if the MAC of the NIC 20 is matched with the MACs of the LAN channels of the management controller 30.

The updating module 13 reads installation information, such as the IP address, the subnet mask and the IP gateway, of the NIC 20 if the MAC of the NIC 20 is determined to be matched with any one of the MACs of the LAN channels of the management controller 30, and updates installation fields of corresponding LAN channels of the management controller 30 with the read installation information, so as to keep the IP installation information of the LAN channel to be matched with the IP installation information of the NIC 20.

Figure 2:
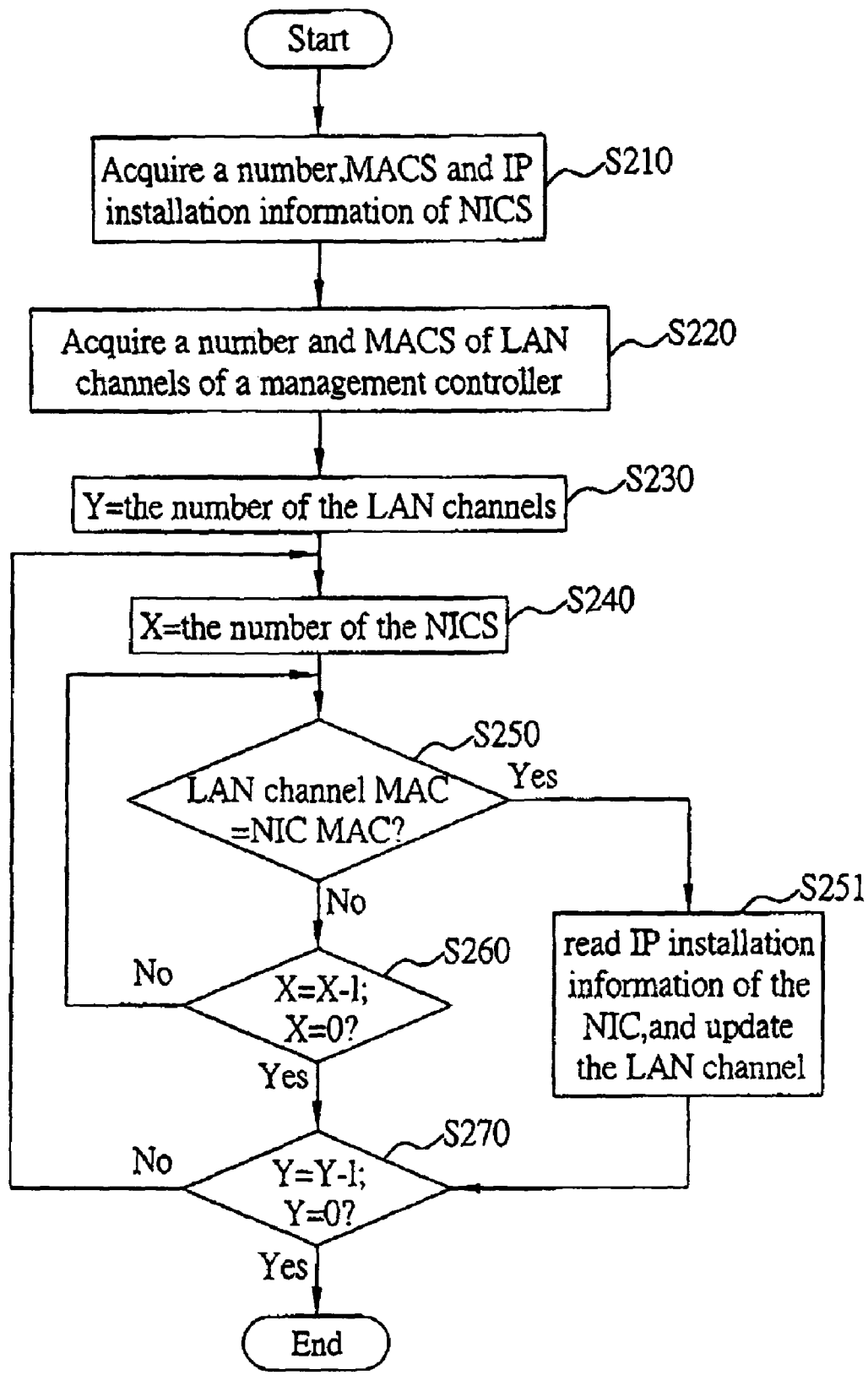
FIG. 2 is a flow chart of an IP address updating method corresponding to the IP address updating system shown in FIG. 1 according to the present invention.

Please refer to FIG. 2, which is a flow chart of an IP address updating method corresponding to the IP address updating system 10 according to the present invention Initially, in step S210 the IP detecting tool is used to acquire through the operating system a number of the NIC 20 attached to the network server 1, the MAC of the NIC 20, and any other IP installation information, such as the IP address, the sublet mask and the IP gateway.

In step S220, which is executed after step S210, the SMS is used to acquire through the, IPMI driver a number and the MACs of the LAN channels of the management controller 30.

In step S230, which is executed after step S220, an initial value of an installation parameter (Y) is set equal to the number of the LAN channels of the management controller 30.

In step S240, which is executed after step S230, another initial value of an installation parameter (X) is set equal to the number of the NIC 20.

In step S250, which is executed after step S240, one of the LAN channels is selected, and a MAC of the selected LAN channel is compared with the MAC of the NIC 20 to determine if the MAC of the selected LAN channel is matched with the MAC of the NIC 20. If the MAC of the selected LAN channel is matched with the MAC of the NIC 20, then go to step S251, else go to step S260.

In step S251, the IP address, the subnet mask and the IP gateway of the NIC 20 are read and used to update corresponding installation fields of the selected LAN channel, so as to keep the IP installation information of the selected LAN channel to be matched with the NIC 20.

In step S260, (X) is decreased by one, that is (X)=(X)−1, and the decreased (X) is determined if it is equal to zero. If (X) is not equal to zero, then return to step S250 to select a next NIC 20 and to compare a MAC of the selected NIC 20 with the MAC of the selected IAN channel. If (X) is equal to zero, the MACs of all of the NICs 20 have been compared and determined to be not matched with the MAC of the selected LAN channel.

In step S270, which is executed after step S251 when the MAC of the selected LAN channel is matched with the MAC of the NIC 20 or after step S260 when the MAC of the selected LAN channel is not matched with the MAC of the NIC 20. (Y) is decreased by one, that is (Y)=(Y)−1, and the decreased (Y) is determined if it is equal to zero. If (Y) is not equal to zero, then return to step S240 to select a next LAN channel and to compare a MAC of the selected NIC 20 with the MAC of the newly selected LAN channel. If (Y) is equal to zero, the MACs of all of the NICs 20 have been compared with the MAC of the newly selected LAN channel. The IP address updating method ends in step S270.

In contrast to the prior art, the IP address updating system and related method of the present invention acquires the IP installation information of the NICs 20 of the network server 1, compares the acquired MACs of the NICs 20 with the MACs of the LAN channels of the management controller 30 to find out a LAN channel matched with the NIC 20, and updates the installation fields of the found LAN channel with the IP installation information of the NIC 20. Therefore, the IP installation of the LAN channels of the management controller are updated automatically as long as the IP installation information of the NIC 20 are changed. The system manager needs not to update the IP address time after time any more, so the installation work to install the IP information of the management controller 30 are improved, and the network server 1 has better efficiency of management.

By virtue of the above-discussed indicating system and method, the user can conveniently and exactly implement corresponding operation by the indicating function with multiple forms without complex ibulgeifying operation, and can adroitly grip the operating action of the electronic device.

The above-described exemplary embodiments are to describe various objects and features of the present invention as illustrative and not restrictive of the scope-of the essential technical content according to the present invention, the essential technical content of the present invention is broadly defined in the appended claim, if the exemplary embodiments or method implemented by any one are completely identical to the following claim or only an equivalent change of the following claim, all that is considered to fall with the scope of the invention.

What is claimed is:

1. An internet protocol (IP) address updating system for a network server having a management controller, the IP address updating system comprising:
    an acquiring module for detecting media access addresses (MAC) of network interface cards (NIC) attached to the network server and channels of the management controller;
    a comparing module for comparing the MACs of the NICs with the MACs of the channels; and
    an updating module for updating installation fields of the channels of the management controller with corresponding IP installation information of the NICs if the comparing module compares that the MACs of the NICs are matched with the MACs of the channels.

2. The IP address updating system of claim 1, wherein the IP installation information is selected from a group consisting of an IP address, a subnet mask, and an IP gateway.

3. The IP address updating system of claim 1, wherein the management controller is a baseboard management controller (BMC) capable of supporting a data transmission standard of an intelligent platform management interface (IPMI).

4. The IP address updating system of claim 1, wherein the acquiring module further acquires the IP installation information of the NICs.

5. The IP address updating system of claim 4, wherein the acquiring module takes a use of an operating system of the network server to acquire the IP installation information of the NICs.

6. The IP address updating system of claim 1 operating based on an operating system of the network server.

7. An IP address updating method for a network server having a management controller, the IP address updating method comprising:
    (1) detecting MACs of NICs attached to the network server and channels of the management controller,
    (2) comparing the MACs of the NICs with the MACs of the channels to determine if the MACs of the NICs are matched with the MACs of the channels, If the MACs of the NICs are determined to be matched with the MACs of the LAN channels executing step (3), or executing step (2) repeatedly; and
    (3) acquiring IP installation information of the NICs, and updating installation fields of the channels with corresponding IP installation information of the NICs.

8. The IP address updating method of claim 7, wherein the IP installation information is selected from a group consisting of an IP address, a subnet mask, and an IP gateway.

9. The IP address updating method of claim 7, wherein the channels of the management controller are local area network (LAN) channels of the management controller.

10. The IP address updating method of claim 9, wherein the LAN channels have their IP installation information be read and installed by system management software through an IPMI driver.

* * * * *